United States Patent

[11] 3,558,831

[72] Inventors Robert E. Prescott
Rumson;
Cornelius Tanis, Colts Neck, N.J.
[21] Appl. No. 722,426
[22] Filed Apr. 18, 1968
[45] Patented Jan. 26, 1971
[73] Assignee Bell Telephone Laboratories, Incorporated
Murray Hill, N.J.
a corporation of New York

[54] TELEPHONE SET BASE STRUCTURE WITH EXTERIOR PLUG CAVITIES IN THE BASE BOTTOM SECURED BY A DETACHABLE BASEPLATE
6 Claims, 5 Drawing Figs.

[52] U.S. Cl. .................... 179/100
[51] Int. Cl. .................... H04m 1/02
[50] Field of Search .................... 179/1P&C, 100D, 100C; 24/221, 221-L; 179/29, 100, 103, 178, 179

[56] References Cited

UNITED STATES PATENTS

| | | | |
|---|---|---|---|
| 2,839,165 | 6/1958 | DeGasso | 24/221 |
| 3,180,946 | 4/1965 | Peters | 179/147 |
| 3,444,329 | 5/1969 | Krumreich | 179/100 |

FOREIGN PATENTS

| | | | |
|---|---|---|---|
| 1,136,378 | 9/1962 | Germany | 179/178 |

*Primary Examiner*—Kathleen H. Claffy
*Assistant Examiner*—Randall P. Myers
*Attorneys*—R. J. Guenther and Edwin B. Cave

ABSTRACT: The line cord and handset cord plugs of a telephone base are fixedly mounted in jacks within exterior cavities of the base bottom. The baseplate is detachably secured to the base by the feet which are rotatable. In addition to locking the plugs into their cavities, the baseplate mass serves as a convenient vehicle for imparting added weight for stability to the base.

PATENTED JAN 26 1971

3,558,831

INVENTORS R. E. PRESCOTT
C. TANIS
BY Charles E. Graves
ATTORNEY

TELEPHONE SET BASE STRUCTURE WITH EXTERIOR PLUG CAVITIES IN THE BASE BOTTOM SECURED BY A DETACHABLE BASEPLATE

This invention relates to telephone station apparatus, and more particularly to telephone base structures.

BACKGROUND OF THE INVENTION

Conventional telephone sets ordinarily consist of a base which houses the switch hook, ringer, network, dialing, and other components —and a handset which contains the transmitter and receiver. The line cord connects to the base through stub terminals within the base or through a prong and snap-type connector. Similarly, the handset is connected to the base through a handset cord which is either coiled for retractility or attached to a cord reel mounted in the base.

In many telephone sets, particularly the lighter weight sets the base, when resting on smooth supporting surfaces, has an undesirable tendency to wander during dialing or when the handset cord is fully extended. Weighting the base is the obvious countermeasure, but none of the specific implementations to date have been altogether satisfactory. Raw bulk added to the base interior, for example, involves extra assembly steps and consumes space needed for other uses; and any visible bulk added to the base exterior is likely to conflict with its aesthetic features.

A problem related to the usage of interior base space, and hence also to the matter of base stability, involves the introduction of the line and handset cords into the base. Currently, the actual connections normally are made in whole or in part by telephone installers on site, a practice both time consuming and costly. Yet any remedy which would eliminate onsite cord work necessarily would in some measure cast the subscriber in the role of the installer. The success of any such scheme thus fully depends on a degree of connector simplicity not heretofore achieved in the telephone station art.

Accordingly one object of this invention is to stabilize a telephone base without resort to interior fill.

Another object of this invention is to achieve the first mentioned object without detracting from —and indeed if possible enhancing —the aesthetic virtues of the telephone.

A further object of this invention is to render it possible for laymen to perform at-home cord connections to a telephone base.

SUMMARY OF THE INVENTION

The invention contemplates the housing of one or more cord plugs in exterior cavities in the bottom of the base, and their containment by a baseplate which itself is detachably secured to the base by the base's supporting feet.

In one embodiment, the baseplate is constructed of heavy guage metal to enhance base stability without resorting to interior fill. The feet advantageously are of a resilient material such as rubber and are rotatably anchored through the base bottom by an integral oversize end flange which avoids expensive metallic fastenings.

One or both of the exterior cavities advantageously are made grossly oversize by telephone station art standards, for the purpose of receiving a like-size weighted plug which lends further stability to the base.

One feature of the invention, accordingly, concerns the use of a baseplate to secure one or more cord plugs into exterior cavities of the telephone base.

Another feature of the invention involves affixing the baseplate to the underside of a telephone base with rotatable feet whose concurrent job is to support the entire telephone.

The invention, its further objects features and advantages will be fully understood from a reading of he description to follow of an illustrative embodiment.

DETAILED DESCRIPTION OF AN ILLUSTRATIVE EMBODIMENT

Figures 1, 3, 4, 5:
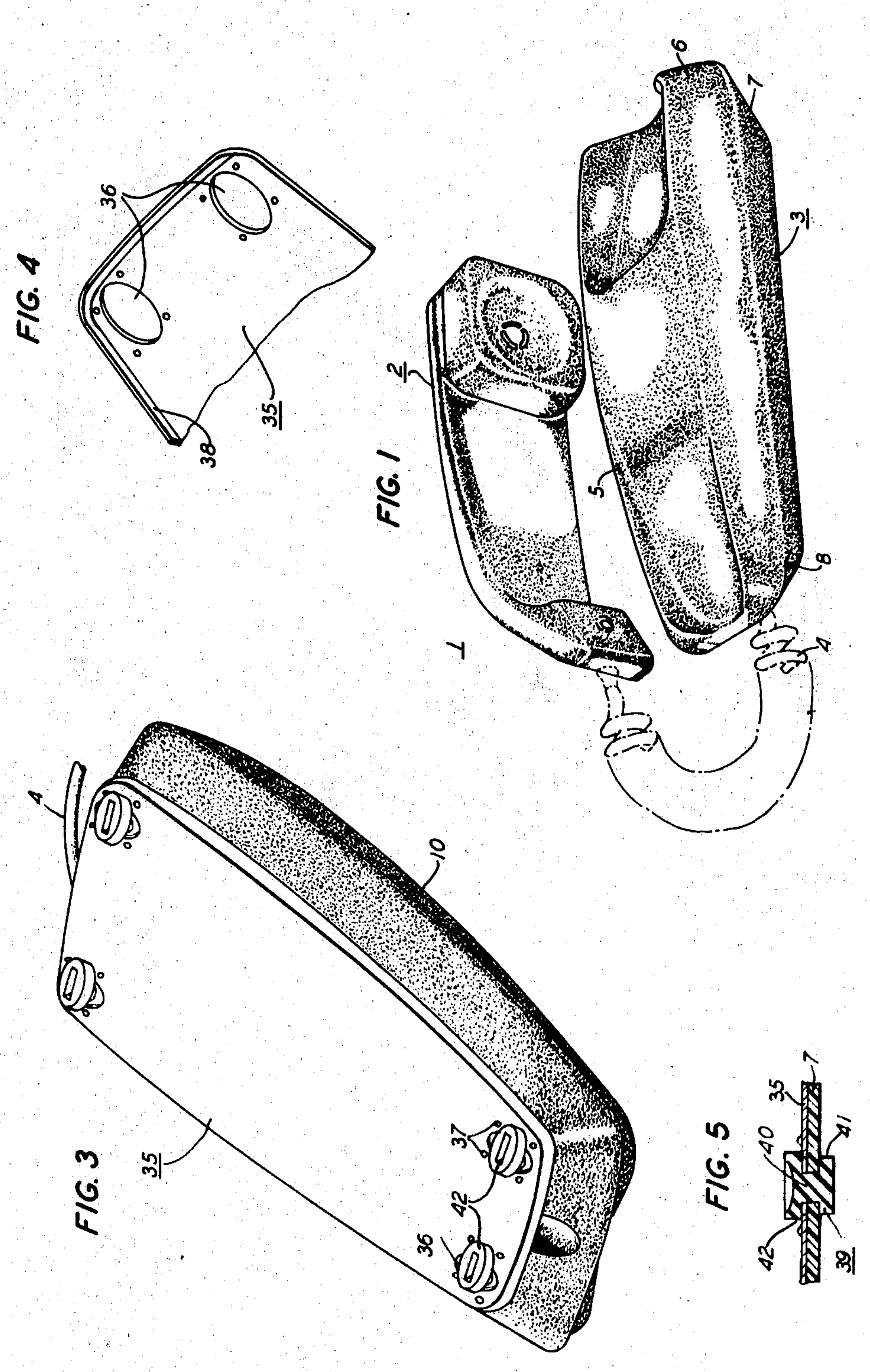
FIG. 1 is a perspective view of a typical telephone in respect to which the invention may be practiced.
FIG. 3 is a perspective view of the base of FIG. 2 showing the baseplate in position.
FIG. 4 is a partial top perspective view of the baseplate.
FIG. 5 is a sectional side view showing the foot detail.

The invention is illustrated by way of its application to the telephone depicted in FIG. 1, which is substantially the set shown and described in R. E. Prescott's earlier application Ser. No. 700,521, filed Jan. 25, 1968 and assigned to applicants' assignee. It is to be understood, however, that the invention can be practiced in a wide variety of telephone bases. The set shown in FIG. 1 consists of a handset 2, and a base 3 connected by a handset cord 4 and including the usual cradle 5 on the upper surface of the base 3.

By way of background, the base housing consists of an upper shell 6 and a lower shell 7 which in this instance are relatively thin-walled structures produced and assembled in accordance with the procedures set out in the above-mentioned patent application. Both shells 6, 7 are advantageously molded of CYCOLAC ABS plastic selected for its excellent stain resistance, high impact strength, color availability, and potential for being formed by a variety of methods including cold forming. After the various components internal to the base 3 are affixed in place, the shells 6, 7 are suitably joined along their mating edge 8.

Figure 2:
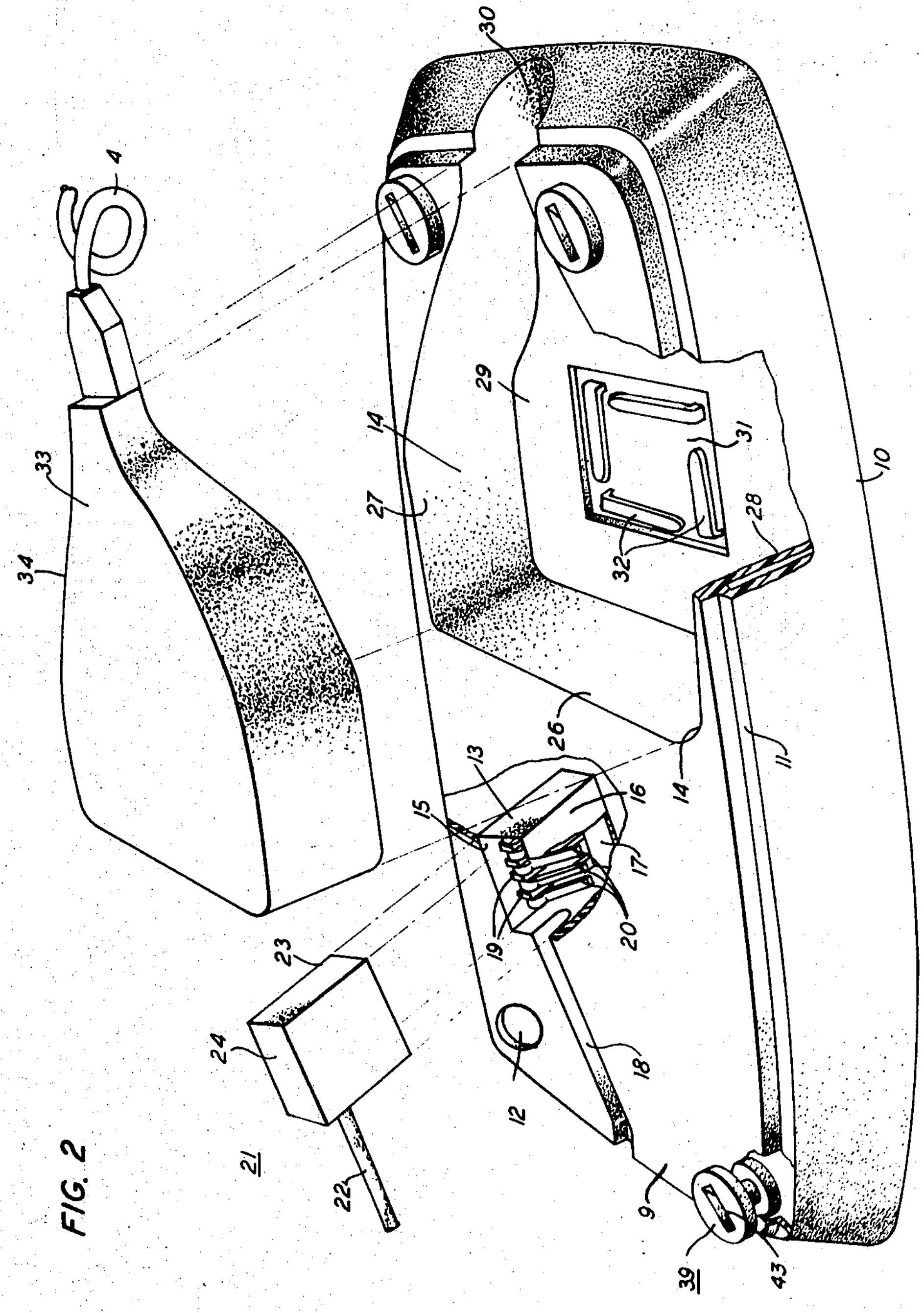
FIG. 2 is a perspective view of the bottom of the telephone base, showing exterior cavities.

The invention involves principally the structure of lower shell 7 which is depicted in FIGS. 2 and 3. The lower shell 7 includes a bottom planar surface 9 which is inset from the side walls 10 to form a shoulder 11. Four holes 12 are placed at the corners through the bottom 9, each being cylindrical as shown in the breakout in FIG. 2 of the lower left-hand hole 12. The interior surface of bottom 10 which is adjacent to holes 12 is free to accommodate rubber feet such as 39 depicted in FIG. 5, in a manner to be described below.

The bottom 9 of lower shell 7 includes two exterior cavities 13, 14 for receiving a line cord jack and a handset cord jack respectively. The entrances to each cavity 13, 14 are, in accordance with one aspect of the invention, from the exterior of bottom surface 9.

The first cavity 13, is in effect the line cord jack and consists of four interior sidewalls such as 15 and 16 viewable in FIG. 2, and a floor 17. A tapered channel 18 running between sidewall 16 and intersecting shoulder 11 at one end of lower shell 7, provides a conduit for the line cord 22. Several metallic spring contacts 19 contained on a fixture such as 20, which is suitably lodged in cavity 13, are connected in routine fashion by means (not shown) to the interior circuitry of base 3. The line cord plug 21 associated with line cord 22 includes several contacts 23 which are spaced for mating relation with the spring contacts 19.

The specific shape of the line cord jack cavity 13 is not important for purposes of the present invention. It is desirable, however, that the height of plug 21 is such that, when the plug is fully inserted in the cavity 13, the surface 24 of plug 21 is substantially coincident with the bottom planar surface 9 of lower shell 7. In such position, that line cord 22 rests wholly within the tapered channel 18.

The second exterior cavity affords a handset cord jack and consists of a forward wall 26, two sidewalls 27, 28 and a floor 29. The sidewalls 27, 28 in the present embodiment taper inwardly toward each other as seen in FIG. 2; and, at the same time, the floor 29 tapers upwardly, so that the three surfaces join to form a funnel-shaped entrance 30.

As is evident, the described shape of cavity 14 is substantially larger than that of cavity 13; and, while the shapes of these cavities are not relevant in the practice of the basic invention, a benefit is derived by incorporating the relatively larger cavity such as 14 into the lower shell 7. Specifically, a rather massive station cord plug such as 33 thus can be accommodated into the cavity 14. The weight of plug 33 may be enhanced by filling its interior with a mixture of polyurethane foam and gravel, pursuant to the teachings of the aforementioned application. The expedient of adding weight to the base in this fashion is one method for overcoming the tendency of the lightweight base to slide on a smooth horizontal surface when in use.

The floor 29 of cavity 14 includes an opening 31 to the interior volume of he base 3 where contacts, such as 32 associated with the circuitry within the base 3, make an appearance. Mating contacts (not shown) associated with plug 33 effect electrical connection with the contacts 32 when the handset cord plug 33 is inserted into cavity 14. As with the line cord plug 21, handset cord plug 33 is advantageously shaped similarly to its receiving cavity 14. The manner in which connection is effected between handset cord 4 and the contacts within plug 33 is conventional.

The height of cord plug 33 should be such, that when plug 33 is inserted into the cavity 14, the surface 34 substantially coincides with the bottom planar surface 9 of lower shell 7. Then, in accordance with the invention, a baseplate such as 35 depicted in FIGS. 3 and 4 is placed onto the bottom for securing both handset cord plug 33 and line cord plug 21.

Baseplate 35 includes 4 corner holes 36 which for reasons to be described advantageously are oval in shape. Each hole 36 is bordered by a plurality of detents 37, which, for example, may simply be machine-embossed into baseplate 35. The flanged periphery 38 of baseplate 35 engages the shoulder 11 of lower shell 7 and affords a substantial horizontal line for added aesthetic merit as well as enhanced structural rigidity for the base.

Pursuant to a prime facet of the invention, baseplate 35 is secured to lower shell by means of feet 39 and in a manner illustrated in FIGS. 2 and 5. Each foot 39 advantageously is made of rubber or some other substance having good frictional gripping characteristics on smooth horizontal surfaces, and consists of a flanged shaft 40 whose flange portion 41 extends through the hole 12 and engages the interior surface of the lower shell 7. The actual foot portion, designated 42, advantageously is oval in plan if the corner holes 36 of baseplate 35 also are oval. In such case, holes 36 are slightly greater than the foot portion 42.

As seen in FIG. 2, each foot 39 is of a dimension that allows free rotation thereof when assembled upon the foot-receiving hole 12. Thus, baseplate 35 is secured to bottom planar surface 9 merely by rotating each foot 39 to align its major axis of the oval with that of the respective corner hole 36. When the corner holes 36 have cleared the foot portions 42, the latter merely are rotated 90° over their detents for locking. This rotation is simplified by the provision of a slot 43 in the face of each foot portion 42 to receive a coin or screwdriver bit.

The entire baseplate 35 advantageously is fabricated of a heavy gauge metal to lend weight to the base. Removal of baseplate 35 is achieved simply by reversing the above-described process. It is apparent that these connections are sufficiently simple to be made by a telephone subscriber or other normally unskilled person. Additionally, the needed weight of the base is afforded in large part by elements which do not interfere with the use of the base's interior space.

It is to be understood that the embodiments described herein are merely illustrative of the principles of the invention. Various modifications may be made thereto by persons skilled in the art without departing from the spirit and scope of the invention.

We claim:

1. A telephone base comprising:

a housing having an interior volume and a bottom;

a first exterior cavity extending from said bottom and into said interior volume for receiving a line cord connector;

a second exterior cavity extending from said bottom and into said interior volume for receiving a handset cord connector;

a unitary generally rectangular flat member disposed upon said bottom for securing said connectors in their respective positions, said member including engaging surfaces; and means connected to said bottom for detachably engaging said surfaces thereby to fasten said member to said bottom.

2. A telephone base pursuant to claim 1, wherein said member is a weighted metallic plate.

3. A telephone base pursuant to claim 1, wherein said means comprises a plurality of compliant feet each rotatably connected to said bottom, and each including a flange for rotating engagement and disengagement with each said member surface.

4. A telephone base pursuant to claim 3, wherein said member further comprises a plurality of elongated slots arranged at the corners of said member, said flanges fitting through said slots in one attitude but rotatably locking over said slots in another attitude.

5. A telephone base pursuant to claim 4, wherein said member comprises a metallic weighted baseplate, said baseplate including a plurality of detents disposed around each said slot for engagement with said feed to lock the latter in locking relation with said baseplate.

6. A telephone base pursuant to claim 5, wherein each said foot further comprises a slotted contact surface for receiving a turning implement.